(12) United States Patent
McDevitt et al.

(10) Patent No.: US 7,171,576 B2
(45) Date of Patent: Jan. 30, 2007

(54) METHOD, APPARATUS AND PROGRAM STORAGE DEVICE FOR PROVIDING CLOCKS TO MULTIPLE FREQUENCY DOMAINS USING A SINGLE INPUT CLOCK OF VARIABLE FREQUENCY

(75) Inventors: Hugh W. McDevitt, San Jose, CA (US); Carol Spanel, San Jose, CA (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/410,385

(22) Filed: Apr. 9, 2003

(65) Prior Publication Data

US 2004/0205370 A1    Oct. 14, 2004

(51) Int. Cl.
G06F 1/06    (2006.01)
(52) U.S. Cl. .................. 713/501; 713/500; 713/502
(58) Field of Classification Search ............. 713/500, 713/501
See application file for complete search history.

(56) References Cited

U.S. PATENT DOCUMENTS

| | | | |
|---|---|---|---|
| 4,929,918 A * | 5/1990 | Chung et al. ............... 331/10 |
| 4,989,223 A | 1/1991 | Katayose et al. |
| 5,359,232 A | 10/1994 | Eitrheim et al. |
| 5,416,443 A | 5/1995 | Cranford, Jr. et al. |
| 5,553,276 A | 9/1996 | Dean |
| 5,740,410 A | 4/1998 | McDermott |
| 5,963,070 A | 10/1999 | Kaulkner et al. |
| 5,964,883 A * | 10/1999 | Hewitt ....................... 713/503 |
| 5,999,060 A | 12/1999 | Zuta |
| 6,028,641 A | 2/2000 | Kim |
| 6,111,448 A | 8/2000 | Shibayama |
| 6,177,959 B1 | 1/2001 | Bril |
| 6,188,258 B1 | 2/2001 | Nakatani |
| 6,366,174 B1 | 4/2002 | Berry et al. |
| 6,785,829 B1 * | 8/2004 | George et al. ............. 713/320 |
| 6,885,254 B2 * | 4/2005 | Kranz ......................... 331/74 |
| 2002/0023239 A1 | 2/2002 | Nomura et al. |

FOREIGN PATENT DOCUMENTS

GB    2 304 427 A    3/1997

* cited by examiner

*Primary Examiner*—Lynne H. Browne
*Assistant Examiner*—Paul Yanchus, III
(74) *Attorney, Agent, or Firm*—David W. Lynch; Chambliss, Bahner & Stophel, P.C.

(57) ABSTRACT

A method, apparatus, and program storage device for providing clocks to multiple frequency domains using a single input clock of variable frequency. Independent clock signals are generated at predetermined clock frequency targets in response to control signals that are based on a determined bus clock frequency.

21 Claims, 7 Drawing Sheets

Fig. 3

| Main Bus Frequency Range | Comments | Processor Clock | Interface Clock 1 | Interface Clock 2 | Memory Clock | Internal Clock 1 | Internal Clock 2 |
|---|---|---|---|---|---|---|---|
| <33 MHz | ERROR - Allow Processor Clock to run in order to do error recovery. | 1:1 | N/A | N/A | N/A | 1:1 | 1:1 |
| 33 - 33.33 MHz | | 6:1 | 4:1 | 3:1 | 5:1 | 4:1 | 2:1 |
| 33.4 – 40 MHz | | 5:1 | 3:1 | 2.5:1 | 4:1 | 2.5:1 | 1.5:1 |
| 40.1 – 50 MHz | | 4:1 | 2.5:1 | 2:1 | 3:1 | 2:1 | 1:1 |
| 50.1 - 66.67 MHz | | 3:1 | 2:1 | 1.5:1 | 2.5:1 | 1.5:1 | 1:1 |
| 66.67 - 83.33 MHz | | 2:1 | 1.5:1 | 1:1 | 2:1 | 1:1 | 1:1.5 |
| 83.33 – 100 MHz | | 2:1 | 1:1 | 1:1.5 | 1.5:1 | 1:1 | 1:1.5 |
| 100 - 111.0 MHz | | 1.5:1 | 1:1 | 1:1.5 | 1.5:1 | 1:1 | 1:2 |
| 111.10-133.33 MHz | | 1.5:1 | 1:1 | 1:1.5 | 1:1 | 1:1 | 1:2 |
| >133.33MHz | Error - Clock is too fast. | | | | | | |

| | Comments | Processor Clock | Interface Clock 1 | Interface Clock 2 | Memory Clock | Internal Clock 1 | Internal Clock 2 |
|---|---|---|---|---|---|---|---|
| 1Hz | ERROR - Allow Processor Clock to run in order to do error recovery. | 1:1 | N/A | N/A | N/A | 1:1 | 1:1 |
| 3.33 MHz | 13197 to 13330 Corresponds to a nominal 32.9925 MHz to 33.325 MHz | 6:1 | 4:1 | 3:1 | 5:1 | 4:1 | 2:1 |
| ~40 MHz | 13331 to 15997 Corresponds to 33.3275 MHz to 39.9925 MHz | 5:1 | 3:1 | 2.5:1 | 4:1 | 2.5:1 | 1.5:1 |
| ~50 MHz | 15998 to 19997. Corresponds to 39.995 MHz to 49.9925 MHz. | 4:1 | 2.5:1 | 2:1 | 3:1 | 2:1 | 1:1 |
| 66.67 MHz | 19998 to 26663. Corresponds to 49.995 MHz to 66.6575 MHz | 3:1 | 2:1 | 1.5:1 | 2.5:1 | 1.5:1 | 1:1 |
| ~83.33 MHz | 26664 to 53329. Corresponds to 66.66 MHz to 83.3225 MHz | 2:1 | 1.5:1 | 1:1 | 2:1 | 1:1 | 1:1.5 |
| ~100 MHz | 33330 to 39996. Corresponds to 83.325 MHz to 99.99 MHz. | 2:1 | 1:1 | 1:1 | 1.5:1 | 1:1 | 1:1.5 |
| 111.0 MHz | 39997 to 44395. Corresponds to 99.9925 MHz to 110.9875 MHz | 1.5:1 | 1:1 | 1:1.5 | 1.5:1 | 1:1 | 1:2 |
| ~133.33 MHz | 44396 to 53328. Corresponds to 110.99 MHz to 133.32 MHz. | 1.5:1 | 1:1 | 1:1.5 | 1:1 | 1:1 | 1:2 |
| 33 MHz | 53329 or above. Error count too high. | | | | | | |

Fig. 4

METHOD, APPARATUS AND PROGRAM STORAGE DEVICE FOR PROVIDING CLOCKS TO MULTIPLE FREQUENCY DOMAINS USING A SINGLE INPUT CLOCK OF VARIABLE FREQUENCY

BACKGROUND OF THE INVENTION

1. Field of the Invention

This invention relates in general to timing and clock systems in integrated electronics, and more particularly to a method, apparatus and program storage device for providing clocks to multiple frequency domains using a single input clock of variable frequency.

2. Description of Related Art

Many complex integrated circuits, and in particular application specific integrated circuits (ASICs), have multiple variable interfaces to allow for interconnecting different components. For example, an ASIC may include an off-board interface, a processor bus, standard interfaces and memory interfaces. In addition to these interfaces, an ASIC may also include one or more internal clocks which could be asynchronous to all of the interfaces.

However, data may need to be transferred between the interfaces on the chip and across asynchronous boundaries. This creates performance difficulties due to having to use methods to synchronize the data. More importantly this creates tremendous challenges in verifying functionality before the ASIC is sent to a foundry for fabrication. Still further, many external oscillator devices are usually needed to provide all of the different clocks.

For example, an ASIC may include an off-board interface and standard interfaces that are all peripheral component interconnect (PCI-X) interfaces and which are also PCI 2.2 compliant. This implies that the frequency of the clock coming into the ASIC can range from 0 to 1.33 MHz. Depending on loading conditions on each of the standard on board interfaces, the desired frequency to those interfaces may vary. Further, the processor interface may need to operate at a higher frequency, e.g., 200 MHz and a memory may need to operated at 133 MHz. An internal clock may be provided with a separate oscillator operating at 66 MHz. There may also be functional islands to perform compression which need to run at 100 MHz and another functional island to perform encryption which needs to run at 50 MHz. A first standard interface may be a 66 MHz PCI, while a second standard interface may be a PCI-X operating at 133 MHz. Accordingly, the ASIC could require as many as 6 external components and numerous internal phase-locked loops (PLLs) in order to provide all of these signals.

Depending on the implementation, data transfers could span asynchronous boundaries in almost every direction across the clock domains. Since many of the clocks in the example above have a range of valid frequencies, verification becomes very complex. In the above example, there are essentially 6 variables with many different valid values for each variable. Because crossing asynchronous boundaries can introduce timing and logic problems, it is important to do a thorough job in verification to reduce the possibility of having to fabricate the chip another time.

To provide multiple frequency domains as described above, most designs will use multiple oscillators or will fix the relationships between the different clock partitions even though the main bus may provide the main clock. However, using multiple oscillators has the disadvantage of multiple parts. Further, this will be more costly and will result in worse reliability and more difficulty placing and writing the board then will this invention. This also has the disadvantage of having asynchronous boundaries between the main bus and the rest of the chip. This can cause tough design problems and additional verification. Nevertheless, fixed relationships suffer from their own particular disadvantages. Referring to the above example, fixing relationships would, for example, result in a 1.5 to 1 relationship between the processor and the main bus oscillator. However, as the main bus oscillator is reduced, so are all of the other frequencies thereby performance by causing the one or more of the other clock frequencies to violate their required frequency ranges.

It can be seen that there is a need for a method, apparatus and program storage device for providing clocks to multiple frequency domains using a single input clock of variable frequency.

SUMMARY OF THE INVENTION

To overcome the limitations in the prior art described above, and to overcome other limitations that will become apparent upon reading and understanding the present specification, the present invention discloses a method, apparatus and program storage device for providing clocks to multiple frequency domains using a single input clock of variable frequency.

The present invention solves the above-described problems by generating independent clock signals at predetermined clock frequency targets in response to control signals that are based on a determined bus clock frequency.

A clock circuit in accordance with the principles of the present invention includes a bus clock determining circuit, the bus clock determining circuit monitoring the bus clock for providing a bus clock determination value, a controller, coupled to the bus clock determining circuit, the controller receiving the bus clock determination value and generating independent control signals based on the determined bus clock frequency and predetermined clock frequency targets and a clock signal generator, coupled to the controller, for receiving the independent control signals and generating clock signals at the predetermined clock frequency targets in response to the independent control signals.

In another embodiment of the present invention, an application specific integrated circuit is provided. The application specific integrated circuit includes a plurality of interfaces, the interfaces providing access to asynchronous devices and a clock circuit for providing clocks to multiple frequency domains for transferring data between the plurality of interfaces using a single input clock of variable frequency, the clock circuit further including a bus clock determining circuit, the bus clock determining circuit monitoring the bus clock for providing a bus clock determination value, a controller, coupled to the bus clock determining circuit, the controller receiving the bus clock determination value and generating independent control signals based on the determined bus clock frequency and predetermined clock frequency targets and a clock signal generator, coupled to the controller, for receiving the independent control signals and generating clock signals at the predetermined clock frequency targets in response to the independent control signals.

In another embodiment of the present invention, a program storage device, readable by a computer, tangibly embodying one or more programs of instructions executable by the computer to perform a method for providing clocks to multiple frequency domains using a single input clock of variable frequency. The method includes determining a bus clock frequency, deriving independent control signals based on the determined bus clock frequency and predetermined clock frequency targets and generating clock signals at the predetermined clock frequency targets in response to the derived control signals.

In another embodiment of the present invention, a method for providing clocks to multiple frequency domains using a single input clock of variable frequency is provided. The method includes determining a bus clock frequency, deriving independent control signals based on the determined bus clock frequency and predetermined clock frequency targets and generating clock signals at the predetermined clock frequency targets in response to the derived control signals.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a table illustrating the ratios for generating independent frequency control signals according to the present invention;

FIG. 4 illustrates a bin table according to the present invention showing conversion ratios for the bus clock and the interface frequencies taking into account bus clock drifts;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method, apparatus and program storage device for providing clocks to multiple frequency domains using a single input clock for variable frequency. Independent clock signals are generated at predetermined clock frequency targets in response to control signals that are based on a determined bus clock frequency.

Figure 1:
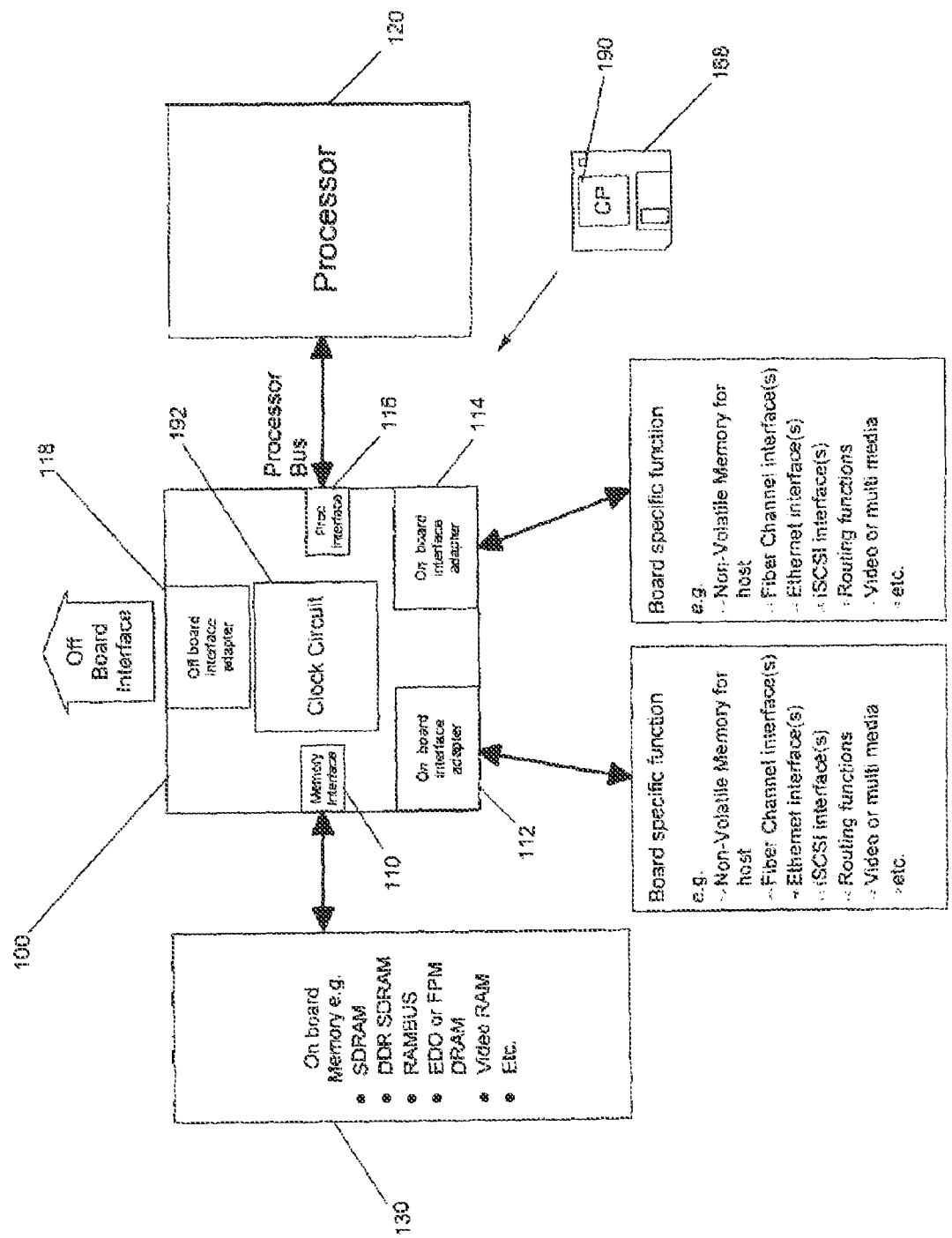
FIG. 1 illustrates an ASIC with multiple variable interfaces according to the present invention.

FIG 1 illustrates an ASIC 100 with multiple variable interfaces 110–118 according to the present invention. In FIG. 1, there are 5 interfaces 110–118 depicted. However, the present invention is not meant to be limited to the number or type of interfaces described herein. FIG. 1 illustrates five interfaces that include the off-board interface 118, the processor bus interface 116, standard interfaces 112, 114 and a memory interface 110. The ASIC 100 also includes a clock circuit 192 for providing clocks to multiple frequency domains using a single input clock of variable frequency according to the present invention.

The off-board interface 118 may be an interface such as a PCI, PCI-X, Versa Module Eurocard (VME), etc. The off-board interface 118 could also be a non-standard interface. The off-board interface 118 provides a clock to the ASIC 110 which is used as part of the bus. The processor bus interface 116 allows for communication between a processor 120 of any type and the ASIC. The processor 120 can be a i960®, PowerPC®, Strong ARM®, XScale™, MIPs®, etc. The clocking for the processor bus interface 116 is sometimes provided by the processor 120, which would ensure that the processor 120 was synchronized with the clock that was provided to the external bus of the processor 120. However, sometimes the clocks are generated external to both the ASIC 100 and the processor 120 via a clock generator. The ASIC 100 can also generate the clocks which go to both the processor 120 and the ASIC 100.

Within design constraints, any number of standard interfaces 112, 114 may be provided. For parallel interfaces, the practical limit may be 2 to 4. However, for switched interfaces like RapidIO or InfiniBand®, there may be a large number of standard interfaces provided. Clocking for the standard interfaces 112, 114 is normally performed by the ASIC 100, which must provide a synchronous clock to itself and all the loads on the standard interfaces 112, 114. The memory interface 110 couples a memory 130 to the ASIC 100. The memory interface 110 may be for a Synchronous Dynamic Random Access Memory (SDRAM), Double Data Rate (DDR), etc. For high performance systems, the ASIC 100 usually provides these clocks to the synchronous memory devices 130.

In addition to these interfaces, the ASIC 100 may also have one or more internal clocks which could be asynchronous to all of the interfaces 110–118. There may be a requirement to transfer data between interfaces 110–118 on the ASIC 100 and across asynchronous boundaries. This creates performance difficulties due to having to use methods to synchronize the data. However, more importantly, this creates tremendous challenges in verifying functionality before the ASIC 100 is fabricated. In addition, many external oscillator devices may have to be used to provide all of the different clocks.

Referring to FIG. 1, if the off-board interface 118 and the standard interfaces 112, 114 are all PCI-X interfaces which are also PCI 2.2 compliant, the frequency of the clock coming into the ASIC 100 can range from 0 to 133 MHz. Depending on loading conditions on each of the standard on board interfaces 112, 114 the desired frequency to the standard interfaces 112, 114 may vary. The processor 120 may be running at approximately 200 MHz. The memory 130 could operate at 133 MHz frequency and the internal clock may be provided with a separate oscillator running at 66 MHz. Functional islands may also be provided to perform compression, which may run at 100 MHz. Another functional island may be provided to perform encryption, which may run at 50 MHz. A first standard interface 112 may be a 66 MHz PCI, while a second standard interface 114 may be a PCI-X running at 133 MHz. Accordingly, the ASIC 100 could require as many as 6 external components and numerous internal PLLs in order to provide all of the above-described signals.

Depending on the particular implementation, the above-described example could involve data transfers that span asynchronous boundaries in almost every direction. Since many of the clocks in the example above have a range of valid frequencies, verification becomes very complex. There are essentially 6 variables with many different valid values for each variable. Since crossing asynchronous boundaries can introduce timing and logic problems, thoroughly verifying all functions is necessary to reduce the possibility of having to fabricate the chip another time.

Figure 2:
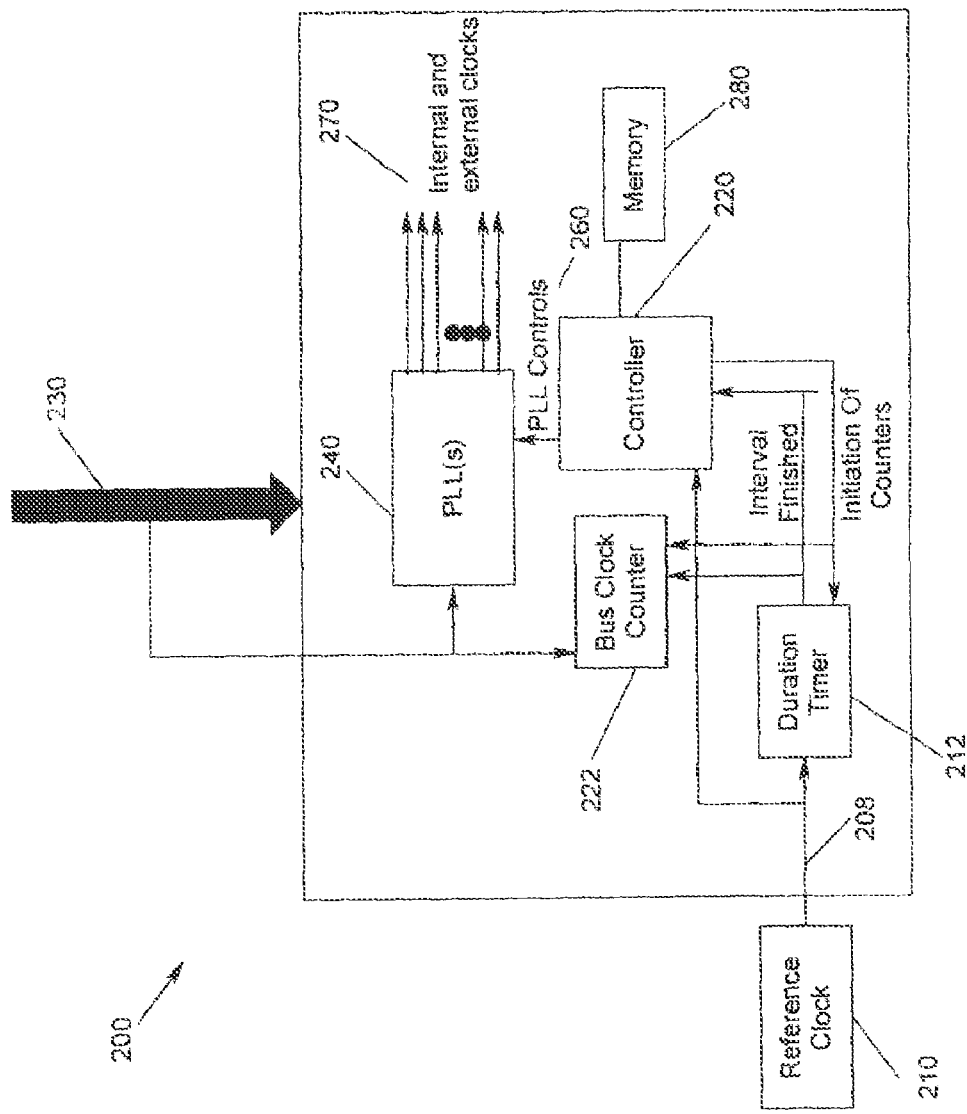
FIG. 2 illustrates a clock circuit for providing clocks to multiple frequency domains using a single input clock of variable frequency according to the present invention.

FIG. 2 illustrates a clock circuit 200 for providing clocks to multiple frequency domains using a single input clock of variable frequency according to the present invention. In FIG. 2, the reference clock 210 is an oscillator or crystal or clock distribution chip, which provides a known good stable clock signal 208 of frequency $F_{ref}$. This signal feeds a counter (Duration Timer 212) which uses the reference clock signal 208 to count for a specific period of time —$T_{ref}$. For example, if $F_{ref}$ is 25 MHz and a good value for $T_{ref}$ is 400 microseconds, then the Duration Timer 212 needs to count for 10,000 cycles in order to measure 400 microseconds. The Duration Timer 212 would include a comparator circuit (not shown) for determining when the Duration Timer 212 had counted 10,000 cycles. At that time, the Duration Timer 212 would issue the Interval Finished signal to the overall controller (Controller 220) and the Bus Clock Counter 222.

The Bus Clock Counter 222 is another counter which is initiated at the same time as the Duration Timer 212. This initiation is done by the Controller 220. When the Duration Timer 212 is finished, the Bus Clock Counter 222 is stopped. The value contained in the Bus Clock Counter 222 is then used to determine the frequency of the bus clock 230. The Controller 220 sets the internal and external clock frequencies depending on the value from the Bus Clock Counter 222. In making this determination, the Controller 220 takes into account valid multiplier values for the PLL(s) 240 and clock frequency maximum and minimums as well as valid combinations.

The Controller 220 uses the value obtained from the Bus Clock Counter 222 to determine the frequency of the bus clock 230. The Controller then derives independent control signals 260 based on the determined bus clock frequency and predetermined clock frequency targets. A table, as illustrated in FIGS. 3–4, may be stored in memory 280 so the Controller 220 can set the internal and external clock frequencies. The Controller 220 sets internal and external clock frequencies depending on the value from the Bus Clock Counter 222, valid multiplier values for the PLL(s) 240 and clock frequency maximum and minimums. The PLL(s) 240 use the independent control signals 260 to generate clock signals 270 at the predetermined clock frequency targets.

Referring to FIGS. 1–2, there are four clocks to be derived plus two internal clocks (not shown). The first clock is the clock for processor 120, which should run as close to 200 MHz as possible. The clock for processor 120 should be edge synchronous with the first internal clock. The clock for the first interface 112 should run as close to 133 MHz as possible without going over 133.33 MHz. The clock for the second interface 114 should run as close to 100 MHz as possible without going over 100,000 MHz. The clock for memory 130 should run as close to 166 MHz as possible. The first internal clock (not shown) should run as close to 133 MHz as possible without going over 133.33 MHz. The second internal clock (not shown) should run as close to 66.70 MHz as possible without going over 66.70 MHz.

FIG. 3 illustrates a table 300 illustrating the ratios for generating independent frequency control signals according to the present invention. The values illustrated in FIG. 3 assume that the main bus clock 310 can vary from 33 MHz to 133 MHz. In FIG. 3, ratios 312 are provided for the processor clock 320, interface clock 1 322, interface clock 2 324, memory clock 326, internal clock 1 328 and internal clock 2 330. FIG. 3 illustrates two error conditions. A first error condition 340 is a below range error, wherein the processor clock 320 is allowed to run to provide error recovery. Not that rules are provided only for the processor clock 320, internal clock 1 328 and internal clock 2 330 during this state. A second error 342 occurs when the bus clock is too fast, e.g., greater than 133.33 MHz.

FIG. 3 illustrates eight ranges 350–364 for the bus clock 310 and ratio rules 312 associated with each of these ranges. FIG. 3 illustrates that the clock frequencies for the plurality of interfaces are independent, i.e., there is no fixed relationship between the clock frequencies. For example, when the bus clock 310 is determined to be in the range from 66.67 to 83.33 MHz. 358 or 83.33–100 MHz 360, the processor clock 320 is set to a 2:1 ratio 370, 372 in both instances while the interface clock 1 322 is 1.5:1 374 in the first instance and 1:1 376 in the second instance.

The set of rules and conditions illustrated in FIG. 3 is only an example and can be changed depending on system and implementation conditions. Nevertheless, in this particular example, the internal clocks 328, 330 are constrained in certain bins in order to simplify the verification. By allowing only certain combinations of frequencies, the number of test cases can be reduced.

In order to detect these different bins, count values for the maximum and minimum frequency within the bin range must be determined. However, it is possible that, due to small uncertainties like the amount the reference clock can drift over time, the bin values will need to be a little conservative. This may result in a condition whereby the bus clock may be at 66.666 MHz exactly, but the controller must treat it like a 66.8 MHz clock due to inaccuracies.

FIG. 4 illustrates a bin table 400 wherein an assumption is made that the bus clock drifts 50 parts-per-million (ppm) and 2 cycles of latency in getting in interval_finished signal to the controller and bus counter. The table also assumes a 400 microsecond duration timer and a 33 MHz reference clock.

According to the present invention, there at least three instances where a bus clock frequency determination is made. There is the initial bus clock frequency determination at power-up. In the next instance, the PLLs remain active after the power has been on for a period. The counter is reset and the bus clock counter is monitored to determine whether the counter value has changed. In the third instance, the system is monitored for frequency drift.

Figure 5:
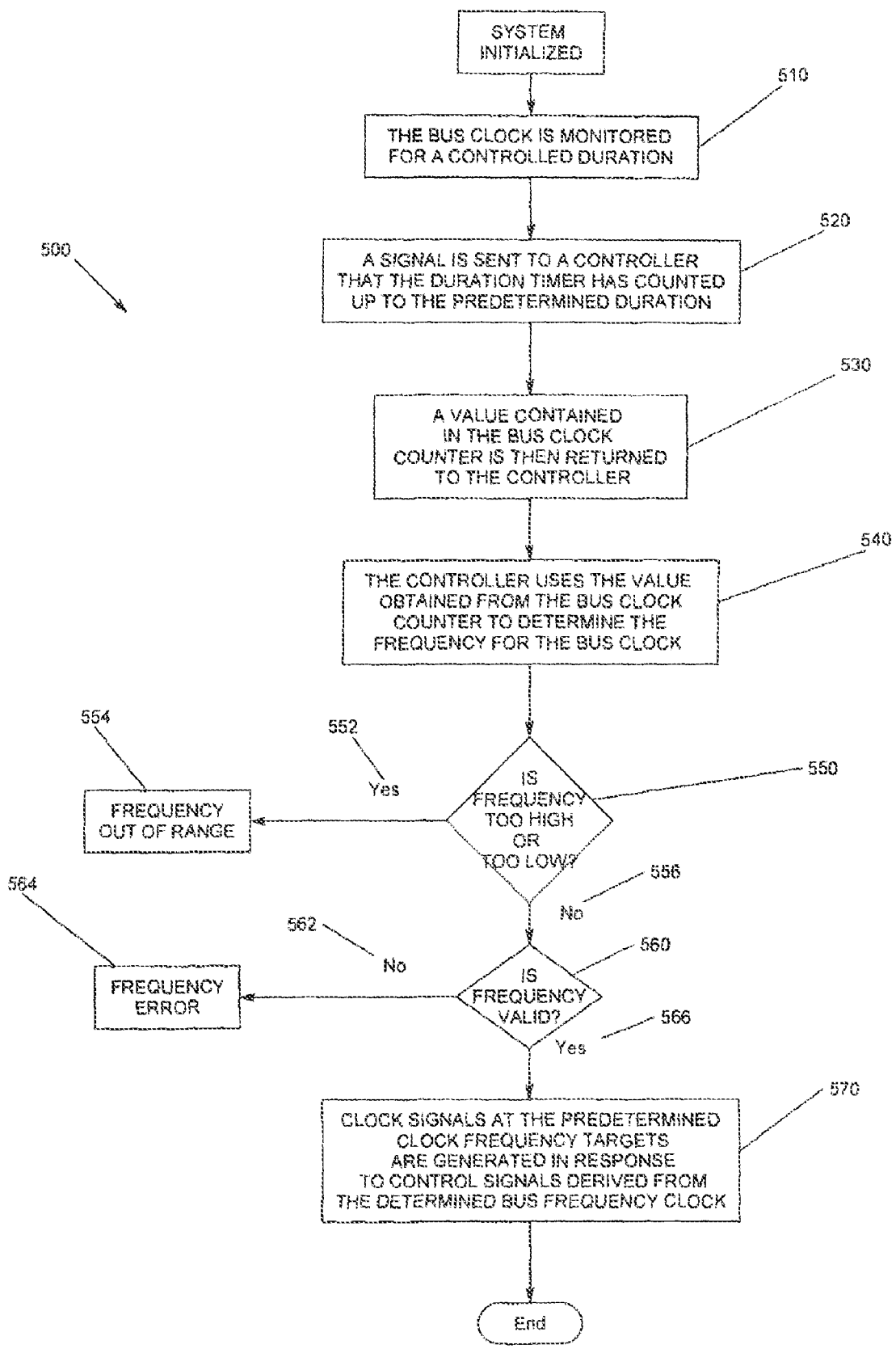
FIG. 5 is a flow chart illustrating the initial bus clock frequency determination according to the present invention.

FIG. 5 is a flow chart 500 illustrating the initial bus clock frequency determination according to the present invention. The bus clock is monitored for a controlled duration by providing a reference clock to a duration timer for counting to a predetermined duration 510. A signal is sent to a controller that the duration timer has counted up to the predetermined duration 520. When the duration timer has counted up to the predetermined duration, the Bus Clock Counter is signaled to stop monitoring the bus clock. A value contained in the Bus Clock Counter is then returned to the controller 530. The controller uses the value obtained from the Bus Clock Counter to determine the frequency of the bus clock 540. The controller derives independent control signals based on the determined bus clock frequency and predetermined clock frequency targets. The controller sets internal and external clock frequencies depending on the value of a Bus Clock Counter, valid PLL multiplier values and clock frequency maximum and minimums. Thus, the controller determines whether the determined frequency is too high or too low 550. If the frequency is too high or too low 552, an error is returned 554. If the frequency is not too high or too low 556, the controller determines whether the frequency matches the environment, i.e., whether the determined frequency valid 560. If the determined frequency is not valid 562, an error is returned 564. Otherwise 566, clock signals at the predetermined clock frequency targets are generated in response to control signals derived from the determined bus frequency clock 570.

Figure 6:
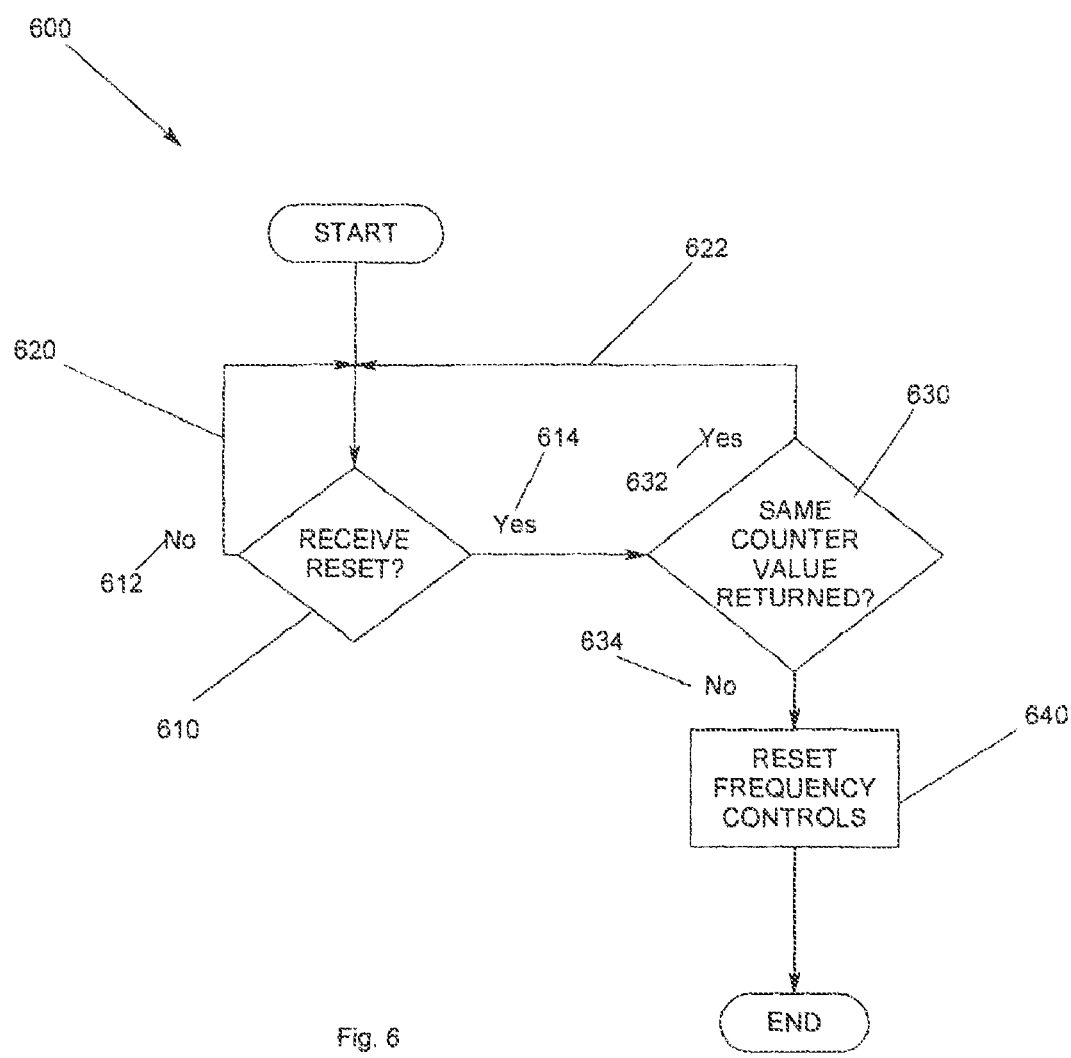
FIG. 6 is a flow chart illustrating bus clock frequency determination when after the power has been on and the bus clock frequency changes according to the present invention.

FIG. 6 is a flow chart 600 illustrating bus clock frequency determination when after the power has been on and the bus clock frequency changes according to the present invention. The controller determines whether a reset is received after the system has been powered-up for a while 610. The controller initiates the duration timer and resets the Bus Clock Counter after the Bus Clock Counter is signaled to stop monitoring the bus clock. The reset begins another bus clock determination process so that the bus clock frequency is continually monitored for updates. If a reset has not been received 612, the controller continues to monitor for a reset 620. If a reset is received 614, the controller determined whether the counter value is the same 630. If the counter value is the same 632, the controller continues to monitor for another reset 622. If the counter value is not the same 634, the PLL is reset at a new frequency 640.

Figure 7:
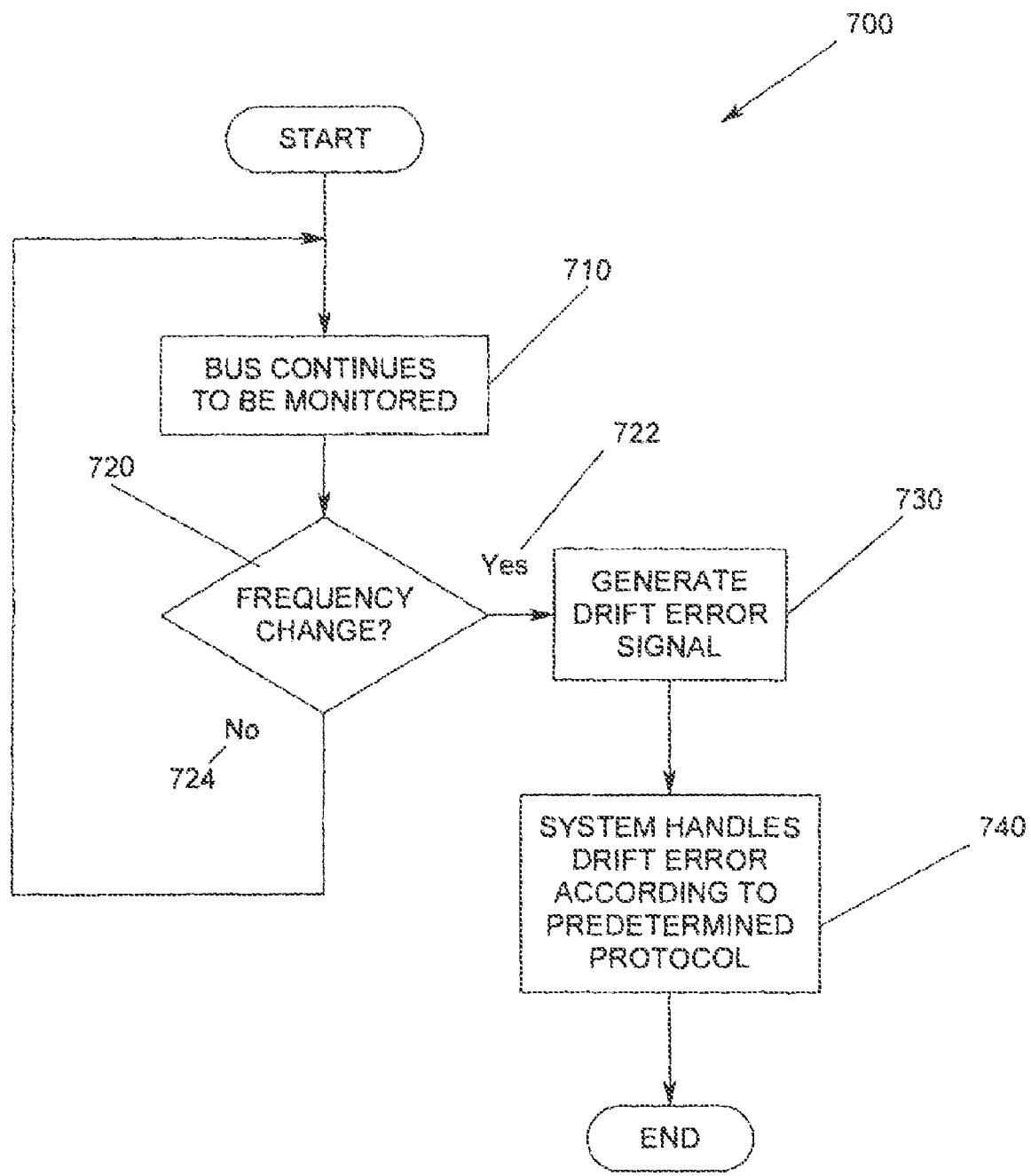
FIG. 7 is a flow chart illustrating the method for monitoring for frequency drift according to the present invention.

FIG. 7 is a flow chart 700 illustrating the method for monitoring for frequency drift according to the present invention. In FIG. 7, the controller monitors the bus clock frequency 710. The controller determines whether the bus clock frequency has changed 720. If the bus clock frequency has changed 722, a drift error is registered 730 and the system handles the drift error according to a predetermined protocol 740. If the bus clock frequency has not changed 724, the controller monitors the bus clock frequency for changes 710.

Referring again to FIG. 1, an ASIC 100 according to the present invention is illustrated. The process illustrated with references to FIGS. 1–7 may be tangibly embodied in a computer-readable medium or carrier, e.g. one or more of the fixed and/or removable data storage devices 168 illustrated in FIG. 1, or other data storage or data communications devices. A computer program 190 expressing the processes embodied on the removable data storage devices 168 may be loaded into the clock circuit 192 to configure the ASIC 100 of FIG. 1 for execution. The computer program 190 comprise instructions which, when read and executed by the ASIC 100 of FIG. 1, causes the ASIC 100 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A clock circuit, comprising:
   a duration timer for counting to a predetermined duration using a reference clock signal, the duration timer issuing a stop signal when the predetermined duration is reached;
   a bus clock determining circuit, coupled to the duration timer, the bus clock determining circuit providing a bus clock determination value by monitoring a bus clock until the duration timer issues the stop signal;
   a controller, coupled to the bus clock determining circuit, the controller receiving the bus clock determination value and generating independent control signals based on the determined bus clock determination value and predetermined clock frequency targets; and
   a clock signal generator, coupled to the controller, for receiving the independent control signals from the controller and generating a plurality of clock signals at predetermined clock frequency targets in response to the independent control signals;
   wherein the bus clock determining circuit further comprises a reference clock for generating the reference clock signal and wherein the controller monitors whether a reset is received, re-initiates the duration timer and resets the bus clock determining circuit after the bus clock determining circuit is signaled to stop monitoring the bus clock when a reset is received, and determines whether the counter value has changed.

2. The clock circuit of claim 1, wherein the controller initiates the duration timer and the bus clock determining circuit and the duration timer begins to count to the predetermined duration and the bus clock determining circuit begins to count bus clock cycles.

3. The clock circuit of claim 1, wherein the controller accesses a value contained in the bus clock determining circuit for determining a bus clock frequency.

4. The clock circuit of claim 3 wherein the controller generates independent control signals based on the determined bus clock frequency and predetermined clock frequency targets based on the value of the bus clock determining circuit, valid PLL multiplier values and clock frequency maximum and minimums.

5. The clock circuit of claim 1, wherein the controller continues to monitor for another reset when the counter value has not changed.

6. The clock circuit of claim 1, wherein the controller resets the control signals to the clock signal generator for generating a new frequency when the counter value has changed.

7. An application specific integrated circuit, comprising:
   a plurality of interfaces the interfaces providing access to asynchronous devices; and
   a clock circuit for providing clocks to multiple frequency domains for transferring data between the plurality of interfaces using a single input clock of variable frequency, the clock circuit further comprising:
      a duration timer for counting to a predetermined duration using a reference clock signal, the duration timer issuing a stop signal when the predetermined duration is reached;
      a bus clock determining circuit, coupled to the duration timer, the bus clock determining circuit providing a bus clock determination value by monitoring a bus clock until the duration timer issues the stop signal;
      a controller, coupled to the bus clock determining circuit, the controller receiving the bus clock determination value and generating independent control signals based on the determined bus clock determination value and predetermined clock frequency targets; and a clock signal generator, coupled to the controller, for receiving the independent control signals from the controller and generating a plurality of clock signals at predetermined clock frequency targets in response to the independent control signals;

wherein the bus clock determining circuit further comprises a reference clock for generating the reference clock signal, and wherein the controller monitors whether a reset is received, re-initiates the duration timer and resets the bus clock determining circuit after the bus clock determining circuit is signaled to stop monitoring the bus clock when a reset is received, and determines whether the counter value has changed.

8. The application specific integrated circuit of claim 7, wherein the controller initiates the duration timer and the bus clock determining circuit and the duration timer begins to count to the predetermined duration and the bus clock determining circuit begins to count bus clock cycles.

9. The application specific integrated circuit of claim 8 wherein the controller accesses a value contained in the bus clock determining circuit for determining a bus clock frequency.

10. The application specific integrated circuit of claim 9 wherein the controller generates independent control signals based on the determined bus clock frequency and predetermined clock frequency targets based on the value of the bus clock determining circuit, valid PLL multiplier values and clock frequency maximum and minimums.

11. The application specific integrated circuit of claim 7, wherein the controller continues to monitor for another reset when the counter value has not changed.

12. The application specific integrated circuit of claim 7, wherein the controller resets the control signals to the clock signal generator for generating a new frequency when the counter value has changed.

13. A program storage device readable by a computer, the medium tangibly embodying one or more programs of instructions executable by the computer to perform a method for providing clocks to multiple frequency domains using a single input clock of variable frequency, the method comprising:

issuing a stop signal based on a comparison of a reference clock pulse count and a predetermined time;

monitoring a bus clock until the stop signal is issued to determine a bus clock frequency;

deriving independent control signals based on the determined bus clock frequency and predetermined clock frequency targets;

generating a plurality of clock signals at the predetermined clock frequency targets in response to the derived independent control signals;

monitoring the bus clock for a controlled duration; and monitoring whether a reset is received, re-initiating the duration timer and resetting the bus clock counter after the bus clock counter is signaled to stop monitoring the bus clock when a reset is received, and determining whether the counter value has changed;

wherein the monitoring the bus clock for a controlled duration further comprises providing a reference clock to a duration timer for counting to a predetermined duration, determining when the duration timer has counted up to the predetermined duration and in response to determining that the duration timer has counted up to the predetermined duration, signaling a bus clock counter to stop monitoring the bus clock.

14. The program storage device of claim 13 further comprising providing a signal to a controller that the duration timer has counted up to the predetermined duration.

15. The program storage device of claim 14 further comprising initiating the duration timer and the bus clock counter causing the duration timer to begin to count to the predetermined duration and the bus clock counter to begin to count bus clock cycles.

16. The program storage device of claim 13 further comprising returning the value contained in the bus clock counter to the controller.

17. The program storage device of claim 16 further comprising using the value contained in the bus clock counter at the controller to determine the frequency of the bus clock.

18. The program storage device of claim 13 wherein the deriving independent control signals based on the determined clock frequency and predetermined clock frequency targets further comprises setting internal and external clock frequencies depending on the value of a bus clock counter, valid PLL multiplier values and clock frequency maximum and minimums.

19. The program storage device of claim 13 further comprising continuing to monitor for another reset when the counter value has not changed.

20. The program storage device of claim 13 further comprising resetting the control signals to the clock signal generator for generating a new frequency when the counter value has changed.

21. A method for providing clocks to multiple frequency domains using a single input clock of variable frequency, comprising:

issuing a stop signal based on a comparison of a reference clock pulse count and a predetermined time;

monitoring a bus clock until the stop signal is issued to determine a bus clock frequency;

deriving independent control signals based on the determined bus clock frequency and predetermined clock frequency targets;

generating a plurality of clock signals at the predetermined clock frequency targets in response to the derived independent control signals;

monitoring the bus clock for a controlled duration; and monitoring whether a reset is received, re-initiating the duration timer and resetting the bus clock counter after the bus clock counter is signaled to stop monitoring the bus clock when a reset is received, and determining whether the counter value has changed;

wherein the monitoring the bus clock for a controlled duration further comprises providing a reference clock to a duration timer for counting to a predetermined duration, determining when the duration timer has counted up to the predetermined duration and in response to determining that the duration timer has counted up to the predetermined duration, signaling a bus clock counter to stop monitoring the bus clock.

* * * * *